United States Patent [19]

Dion et al.

[11] Patent Number: 4,798,932

[45] Date of Patent: Jan. 17, 1989

[54] SOLID PHASE EDGE BONDING OF METAL STRIPS

[75] Inventors: Paul A. Dion, North Attleboro, Mass.; Roderick L. Dair, Hope Valley, R.I.

[73] Assignee: Polymetallurgical Corporation, Attleboro, Mass.

[21] Appl. No.: 73,852

[22] Filed: Jul. 14, 1987

Related U.S. Application Data

[63] Continuation of Ser. No. 827,925, Feb. 10, 1986, abandoned.

[51] Int. Cl.$^4$ ............................................. B23K 20/04
[52] U.S. Cl. .................................. 219/118; 219/155; 228/243; 228/197
[58] Field of Search ................... 219/118, 78.02, 117.1, 219/83, 155; 228/230, 231, 243, 197

[56] References Cited

U.S. PATENT DOCUMENTS

| | | | |
|---|---|---|---|
| 3,095,500 | 6/1963 | Jost | 219/83 X |
| 3,737,979 | 6/1973 | Rakich et al. | 219/102 X |
| 3,811,028 | 5/1974 | Henry et al. | 219/78.02 |
| 3,851,138 | 11/1974 | Metcalfe et al. | 219/78.02 |
| 4,500,028 | 2/1985 | Breedis et al. | 228/243 X |

FOREIGN PATENT DOCUMENTS 575695  5/1959 Canada ............................... 228/197
111583  9/1981 Japan .

OTHER PUBLICATIONS

"Diffusion Welding," in *Welding Handbook*. 6th ed. Section 3B. Ed. Len Gritting, New York: American Welding Society, 1971.

*Primary Examiner*—E. A. Goldberg
*Assistant Examiner*—Teresa J. Walberg
*Attorney, Agent, or Firm*—Samuels, Gauthier, Stevens & Kehoe

[57] ABSTRACT

A continuous process for solid-phase edge bonding a plurality of dissimilar metal strips to form a composite edge-bonded strip. A plurality of elongated metal strips of equal thickness are heated and aligned in a substantially planar, edge-to-edge relationship and pass through a pair of compression bonding rollers. The bonding roller form a rectangular-shaped cavity having a width slightly greater than the combined width of the plurality of strips and a height less than that of the strips, to reduce in thickness and further elongate the metal strips without substantially changing the combined width of the strips and to form a solid-phase bond between adjacent side edges of the strips. The strength of the solid-phase bond is substantially equal to that of the parent metal strips such that the composite strip can be cut or stamped to form detail component parts such as electronic lead frames without bond failure.

10 Claims, 1 Drawing Sheet

SOLID PHASE EDGE BONDING OF METAL STRIPS

This is a continuation of co-pending application Ser. No. 827,925, filed on Feb. 10, 1986, now abandoned.

BACKGROUND OF THE INVENTION

This invention relates to the art of edge bonding of metal strips and more particularly to a method for solid-phase edge bonding of metal strips.

There is considerable need for bonding dissimilar metals edge-to-edge. While the most practical method for edge bonding to date has been the use of electron beam welding, this technique has a number of drawbacks. The principal disadvantage is that electron beam welding creates a small but distinctive weld zone, composed of an alloy of the two metals being welded and a heat-affected area adjacent either side of the alloy. The weld zone is typically the weak link so that, under a tensile load perpendicular to the weld, the composite will usually fail at the weld zone rather than at one of the parent metals. Furthermore, the weld zone possesses characteristics dissimilar to those of the parent metals. These dissimilarities force design engineers to avoid this region and, therefore, incur increased costs due to increased metal consumption. Additional problems include sputter or blow holes in the weld zone, undercut (i.e., lack of weld penetration through the thickness of the composite), camber, and, because the metals are usually welded close to the finish gauge, relatively high production costs.

Another method for edge bonding uses electric resistance welding wherein high levels of electric current are applied to heat the edges of the metal strips to bond the same together. In U.S. Pat. No. 3,811,028 to Henry et al., a method of making a composite edgelay thermostat strip is described in which the two metal rods of hexagonal cross section are bonded by electric resistance welding while applying pressure, the composite is then heated or sintered to assure a complete metallurgical bonding, and the composite is then passed through rollers to reduce the thickness of the composite. In U.S. Pat. No. 3,737,979 to Rakich et al., a composite flat metal strip having portions of different thicknesses is produced by electric welding strips of different thicknesses along adjacent edges and by rolling the composite welded strip between male/female rollers of stepped cross section. In U.S. Pat. No. 3,325,623 to Briggs III, overhanging edges are edge-heated by electric welding to plastic temperature while lateral pressure is applied by rollers and the composite is then rolled to compress the upset bead at the weld.

Another method of making a composite edgelay material is described in U.S. Pat. No. 4,354,301 to Takeuchi et al. In Takeuchi et al., a plurality of metal sheets are bonded in a layer structure, cut into narrow multiple layer strips, turned 90°, and cold-rolled. The strips are then placed in a complimentary-shaped groove for maintaining the width of the strip while hot-rolling to extend in length.

Another method of bonding is described in U.S. Pat. No. 352,947 to Felt. Felt describes a process for manufacturing iron plates, shafts and axle-bars from scrap iron. The scrap articles are arranged in parallel, bound together by wrapping wires, heated, and then hammered or rolled to weld the separate articles together and reduce the same into a long bar or plate. The bars thus produced may be used for small shafts but are preferably combined with additional such layers and hammered together to the proper dimensions.

Methods for solid-phase bonding a pair of strips around a rod are disclosed in U.S. Pat. Nos. 4,227,061 to Westfall et al. and 3,714,701 to Dion et al.

It is an object of the present invention to provide a method for making an edge-bonded composite from a plurality of dissimilar metal strips by solid-phase edge bonding.

Another object is to produce such an edge-bonded composite wherein the bond is substantially as strong as the parent strips.

A still further object is to produce such an edge-bonded composite in a cost-efficient manner, including efficient use of the metal materials and low energy consumption.

SUMMARY OF THE INVENTION

The method of this invention consists of a method for solid-phase edge bonding a plurality of dissimilar metal strips into a composite multimetal strip. The method consists of continuously feeding a plurality of thin flat strips of dissimilar metals into a substantially planar and edge-to-edge relationship. The strips are substantially free from oxide and other contaminants. The strips are heated to a solid-phase bonding temperature and then pressed with enough force to reduce the thickness of the strips and simultaneously solid-phase bond the strips together at their adjacent side edges.

In a preferred embodiment, the strips are electrically heated by passing a current through them. The heating removes contaminants and oxides which are detrimental to bonding. The strips then pass immediately into a retort filled with an oxide-reducing atmosphere to remove any oxide and prevent the formation of any oxide on the strips. The retort includes guiding means for aligning the strips in a substantially planar and edge-to-edge relationship. Immediately upon exiting from the retort the heated and aligned strips enter the nip of a bonding roll stand. The rollers apply pressure to elongate and reduce the thickness of the strips without substantially changing the combined width of the strips and thereby solid-phase edge-bond the strips together. After leaving the bonding rollers the composite immediately enters a retort filled with an oxide-reducing atmosphere and cooling means in order to cool the composite strip without the formation of oxides.

DETAILED DESCRIPTION OF A PREFERRED EMBODIMENT OF THE INVENTION

This invention concerns a method of solid-phase edge bonding two or more metal strips to produce a composite bonded strip. The separate metal strips joined to form a composite can be of the same or different metals, but preferably are different metals.

An edge-bonded composite of two or more distinct metals or alloys provides properties which are unobtainable in a single metal. Furthermore, such composite materials are the most cost-efficient alternative in many applications. For example, they can reduce the amount of precious metals or scarce alloys used. Often a multicomponent subassembly can be replaced with a single composite edge-bonded material to produce a cost savings in assembly labor, manufacturing overhead, and warranty follow-up. Further, the composite may simplify the manufacturing process and provide a more reliable product. The principle design considerations in selecting the diverse metal strips for solid-phase edge bonding are mechanical and physical characteristics, electrical and thermal properties, corrosion resistance, and magnetic properties.

An important application for composite edge-bonded materials is as electronic lead frames. Lead frames are used by manufacturers of integrated circuits, rectifiers, diodes, and other electronic packages. The composite materials are particularly effective in optimizing costs by confining the precious metal to the chip attachment and wire bonding area, thus minimizing the precious metal content in the frame. Furthermore, a solid-phase edge-bonded composite having a uniform and nonporous bond will improve the reliability and yield of electronic circuitry. In addition, today's high-power, high-density devices can lead to heat buildup which the typical controlled expansion electronic alloys alone cannot dissipate. By bonding a high thermal conductivity copper layer to a lead frame alloy the heat dissipating capacity of the package is greatly improved. Typical metals and alloys used in electronic lead frames include: gold, silver, BT, aluminum, ASTM F-15, copper, CDA 194, CDA 155, and alloy 42. A well-known example is the use of ASTM F-15 alloy which is used to match chip expansion combined with a CDA 155 or CDA 194 copper alloy to provide electrical and thermal conductivity.

The method of this invention is especially useful for making composite edge-bonded strips for the above-described electronic lead frames. The composite strip produced by this invention has a bond strength substantially equal to those of the parent materials and thus can be cut or punched into lead frame designs without bond failure.

Figure 1:
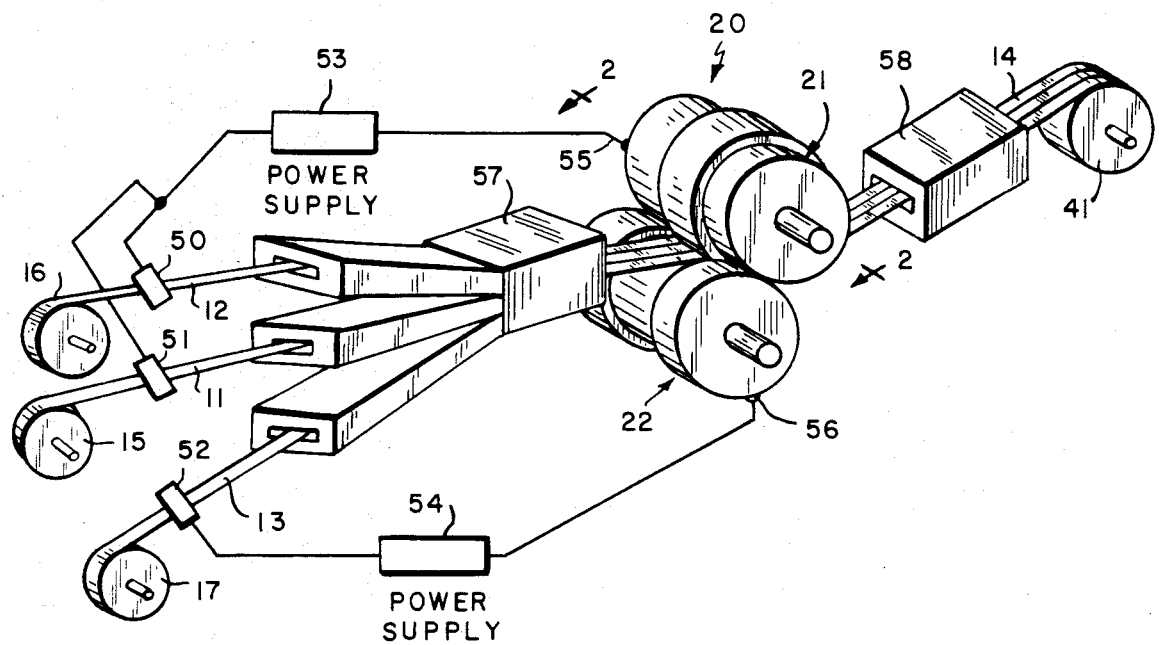
FIG. 1 is a perspective, schematic illustration of a preferred apparatus for edge bonding according to the method of this invention.

FIG. 1 shows a schematic flow diagram according to a preferred embodiment of this invention. A central metal strip 11 issues from a pay-off coil 15 at, for example, 18 ft/min. The central strip is, for example, a copper strip pre-sized at 0.125 inches thick by 0.230 inches wide.

Simultaneously, left and right outer strips 12 and 13 issue from pay-off coils 16 and 17, respectively, at approximately the same speed as the central strip 11. The outer strips 12 and 13 are, for example, a copper alloy pre-sized at 0.125 inches thick by 0.500 inches wide. Thus, each of strips 11, 12 and 13 is thin and flat, all are of the same thickness, and each should have a width to thickness ratio which is greater than ten to one.

The strips 11, 12 and 13 are electrically heated by passing a current through them. The strips have a resistance substantially higher than the rest of the circuit which causes them to become quite hot. The circuit includes, in addition to the strips, electrical contacts 50, 51 and 52, power supplies 53 and 54, and bonding roll contacts 55 and 56 which are grounded.

The moving strips 11, 12 and 13 are resistance heated from room temperature to about 700° F. prior to their entry into an enclosed retort 57. As the strip temperature is increased, the surface contaminants, primarily oily residues, become vaporized. It will be understood that the strips can be decontaminated by means other than heat treating. Other means include, by way of example only and not by way of limitation, mechanical abrasion and chemical treatment.

Successful solid-phase bonding requires that the strips have extremely clean contact surfaces. It is not sufficient to clean the contact surfaces, as by electrical heating or mechanical cutting, because the surfaces immediately oxidize where they are exposed to the oxygen-containing surrounding atmosphere. Therefore, the pre-heated strips 11, 12, and 13 when heated to approximately 700° F. enter the enclosed retort 57 which contains an oxide-reducing atmosphere having a positive pressure to prevent the entry of air into the retort. The retort includes guide means for feeding strips 11, 12, and 13 on converging paths until they are brought together in substantially planar and edge-to-edge alignment, with central strip 11 disposed between outer strips 12 and 13. The three strips are spaced with about 0.005 inches between their adjacent side edges to form a combined width of 1.24 inches, which is substantially equal to that of the final bonded composite.

The pre-heated and aligned strips exit from retort 57 and immediately, before significant oxidation occurs, enter the nip of the bonding roll stand 20. The strips are now at their solid-phase bonding temperature. It is the combination of heat, compression, thickness reduction and elongation which causes the adjacent side edges of the strip to solid-phase bond. By "solid-phase bond" it is meant bonding without the formation of any liquid phase interfacial material. The solid-phase bonding temperature has as its lower limit the minimum of 65 percent of the liquidus temperature of the metal having the lowest melting point and as its upper limit the temperature at which one of the metals would pull apart when worked (hot-short temperature) or the temperature at which brittle compounds or liquid-phase material would form at the interfaces, whichever is lower. The heated metals are rolled together with such a percentage of reduction consistent with the temperatures as to effect a solid-phase bonding of the metals. Preferably, the incoming strips are reduced in thickness of from about 40 to about 60 percent, and more preferably at least about 50 percent.

Figure 2:
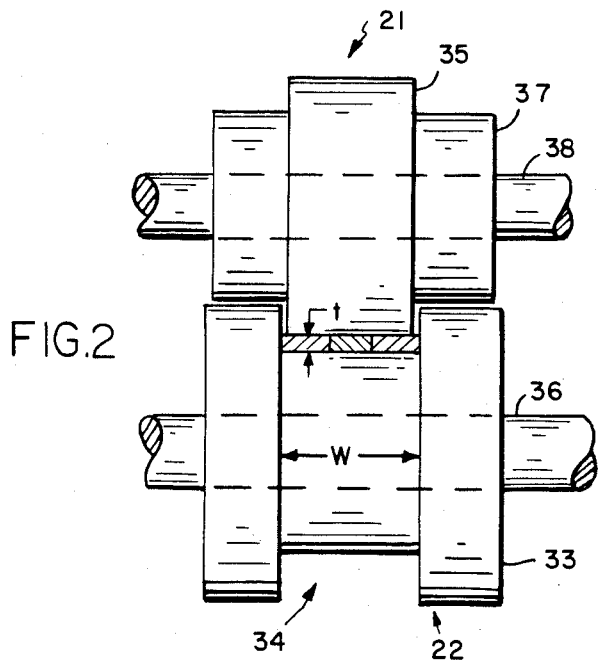
FIG. 2 is a rear view taken along the section lines 2—2 of FIG. 1 showing the metal strips passing between the male and female rollers.

The bonding roll stand 20 employs an upper male roller 21 and a lower female roller 22. The rollers are powered and are set to apply a bonding pressure. The enclosed cavity formed by the bonding rollers is best shown in FIG. 2. The female roller 22 consists of a solid cylinder 33 disposed on an arbor 36. The cylinder 33 is a hardened steel roll into which a rectangular groove has been machined to form a cavity 34. The male roller 21 consists of a solid cylinder 37 disposed on an arbor 38. The cylinder 37 is a hardened steel roll having a projection 35, of a rectangular cross section extending therefrom. The width of the male roller projection 35 is slightly narrower than the width of the female roller cavity 34 so that the rollers fit together to form a rectangular cavity of width w and height equal to the thickness t of the composite strip. The interior bonding cavity is preferably about 5 percent wider than the combined width of the incoming strips and about 50 percent thinner than the thickness of the incoming strips. It is also preferred to heat the bonding rollers to a temperature of from about 600° to about 800° F. In the preferred embodiment described, the bonding rollers are preheated to 600° F. while the strips are heated to 1500° F. and the strip speed is 18 ft/min.

After leaving the bonding rolls at approximately 1500° F., the composite strip is still too hot to expose to the atmosphere without undesirable oxidation occurring. Therefore, an exit retort 58 is entered immediately after bonding. The retort contains an oxide-reducing atmosphere having a positive pressure to prevent the entry of air into the retort. The retort has a relatively long length and permits the composite strip to cool to approximately 500° F. or less without oxidizing. The downstream end of retort 58 is sealed to a water-cooling unit. The composite strip 14 passes through a water bath and emerges from the water-cooling unit and moves to a take-up coil 41 where it is temporarily stored prior to further processing.

Figure 3:
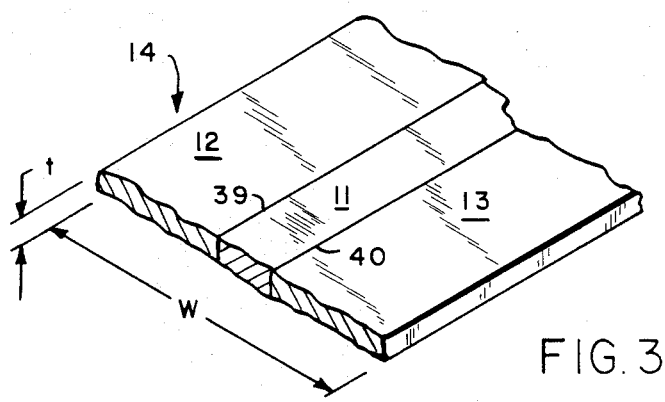
FIG. 3 is a fragmentary perspective view of the composite edge-bonded strip formed by the method of this invention.

As shown in FIG. 3, solid-phase bonding lines 39 and 40 formed between strips 12 and 11 and strips 11 and 13, respectively, are continuous solid-phase bonds at the adjacent side edges of the respective strips. The bond lines are formed throughout the thickness and length of the composite and in a plane substantially perpendicular to the opposing planar faces of the composite. The composite strip 14 has a width w and a thickness t substantially equal to the width and height of the enclosed cavity formed by the bonding rollers 21 and 22.

By way of example, a composite strip was prepared having a central strip of copper and two outer strips of copper alloy. The central strip was C10200, a metal of pure copper, purchased from Anaconda American Brass Co. of Kenosha, Wis., pre-sized at 0.125 inches thick and 0.230 inches wide. The two outer strips were each C19500, a metal of copper with small additions of Fe, P, Co, and Sn, purchased from Olin Corporation of East Alton, Ill., pre-sized at 0.125 inches thick and 0.500 inches wide. The strips were heated to a temperature of 1500° F. and passed between a pair of male and female bonding rollers forming an interior cavity about 5 percent wider than the combined width of the strips and about 50 percent thinner than the incoming strip thickness. The bonding rollers were preheated to 600° F. The strip speed was 18 ft/min. The exiting bonded strip was cooled in a water quench within a hydrogen-filled exit retort. After bonding, the composite strip was rolled, annealed to a finish thickness and temper, and split down the center of the central strip. Bond testing by a modified Olsen cup tester produced metal rupture in the copper alloy but not at the bond interface.

The above description obviously suggests many possible variations and modifications of this invention which would not depart from its spirit and scope. It should be understood, therefore, that the invention is not limited in its application to the details of structures specifically described or illustrated and that within the scope of the appended claims, it may be practiced otherwise than as specifically described or illustrated.

What is claimed is:

1. A method of solid-phase edge bonding a plurality of dissimilar metal strips comprising continuously feeding a plurality of thin flat strips of dissimilar metals into an edge-to-edge alignment in a single plane, said strips being substantially free from oxide and other contaminants, heating said strips to a solid-phase bonding temperature, and passing said heated and aligned strips between a pair of male and female reducing rollers, a plane of said aligned strips being maintained parallel to axes of said rollers, said rollers having coacting surfaces arranged to impart a thickness reduction to each of said strips of about 40 to 60% in a direction perpendicular to the axes of said rollers and to urge the adjacent side edges of said strips together by confining the lateral spread of said strips in a direction parallel to the axes of said rollers, thereby achieving a solid phase bonding of said strips only at said adjacent side edges.

2. The method of claim 1 wherein said pressing is achieved by passing the heated and aligned strips through a pair of male and female bonding rollers which form a rectangular-shaped cavity having a width substantially equal to the combined width of the plurality of strips and a height less than the thickness of the strips.

3. The method of claim 2 wherein said bonding rollers are heated.

4. A method of solid-phase edge bonding a plurality of dissimilar metal strips comprising continuously feeding a plurality of thin flat strips of dissimilar metals into an edge-to-edge alignment in a single plane, said strips being substantially free from oxide and other contaminants, heating said strips in a reducing atmosphere to a temperature in the range having as its lower limit 65 percent of the liquids temperature of the metal having the lowest melting point and as its upper limit the temperature at which one of the metals would pull apart when worked or the temperature at which brittle compounds or liquid phase material would form at the interfaces, whichever is lower, and passing said heated and aligned strips between a pair of male and female compression bonding rollers, the roller axes being parallel to the plane of said aligned strips, said bonding rollers having coacting surfaces arranged to impart a thickness reduction to each of said strips of at least about 40 percent in a direction perpendicular to said roller axes and to confine the lateral spread of said strips in a direction parallel to said roller axes to avoid substantially changing the combined width of said aligned strips and to thereby urge the adjacent side edges of said strips together to form a solid-phase edge-bonded composite strip.

5. The method of claim 4 wherein the strips are reduced in thickness at least about 50 percent.

6. The method of claim 5 wherein the width of the enclosed cavity is up to about 5 percent greater than the combined width of the aligned strips.

7. The method of claim 4 wherein the bonding rollers are heated.

8. The method of claim 7 wherein the strips are heated to a temperature of about 1500° F.

9. The method of claim 8 wherein the bonding rollers are heated to a temperature of from about 600° to about 800° F.

10. The method of claim 9 wherein the strips are heated to a temperature of about 1500° F., the bonding rollers are heated to a temperature of about 600° F., and the strips are reduced in thickness at least about 50 percent.

* * * * *